F. G. FORD.
Flour-Sifters.
No. 145,410. Patented Dec. 9, 1873.
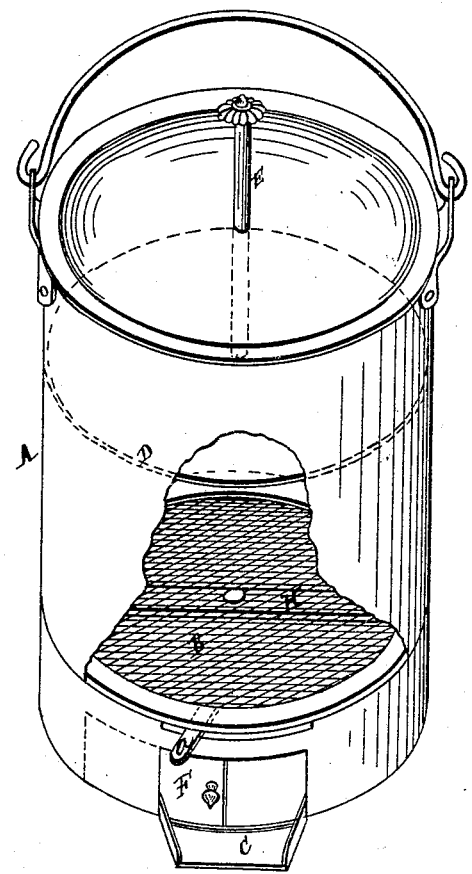

UNITED STATES PATENT OFFICE.

FREDERIC G. FORD, OF PHILADELPHIA, PENNSYLVANIA.

IMPROVEMENT IN FLOUR-SIFTERS.

Specification forming part of Letters Patent No. 145,410, dated December 9, 1873; application filed June 20, 1873.

*To all whom it may concern:*

Be it known that I, FREDERIC G. FORD, of Philadelphia, in the county of Philadelphia and in the State of Pennsylvania, have invented certain new and useful Improvements in Flour and Meal Sifters; and do hereby declare that the following is a full, clear, and exact description thereof, reference being had to the accompanying drawings and to the letters of reference marked thereon, making a part of this specification.

The nature of my invention consists in the construction of a flour and meal pail with two apartments, a sieve and a plunger, as will be hereinafter described.

In the annexed drawings, A represents the pail, which is constructed of wood or metal, or other suitable material, and of any desirable size. Near the bottom of this pail is a partition, B, which is made of gauze-wire or other suitable material to form a sieve. This partition is pivoted on a cross-bar, H, in the pail, and has a handle, a, extending through a slot in the pail for operating it to sift the flour. This partition makes, of course, two apartments, one above it and one below. The upper apartment contains the flour before sifting and the lower after sifting. To the lower apartment is connected a spout, C, and a sliding door, F. After the flour has passed through the sieve it may be removed by sliding the door F back and pouring it out at the spout C. The pail has a top, and through this top passes a stem, E. To the lower end of the stem is secured a head or disk, D, (seen in dotted line,) which, when the flour is placed in the upper apartment, presses down upon it, and not only assists in driving it through the sieve, but removes the particles of flour or meal that adhere to the sides of the vessel. The stem also indicates how much flour is in the pail.

Having thus fully described my invention, what I claim as new, and desire to secure by Letters Patent, is—

The combination of the pail A, rotating-sieve partition B, movable disk D, and stem E, extending through the center of the lid of the pail, all substantially as and for the purposes herein set forth.

In testimony that I claim the foregoing I have hereunto set my hand this 6th day of June, 1873.

F. G. FORD.

Witnesses:
EDM. F. BROWN,
C. L. EVERT.